United States Patent [19]

Lunzer et al.

[11] 4,226,842

[45] Oct. 7, 1980

[54] PREPARATION OF CRYSTALLINE CRYOLITE

[75] Inventors: Friedrich Lunzer, Ottensheim; Werner Kepplinger, Linz, both of Austria

[73] Assignee: Chemie Linz Aktiengesellschaft, Austria

[21] Appl. No.: 56,496

[22] Filed: Jul. 11, 1979

[30] Foreign Application Priority Data

Jul. 14, 1978 [DE] Fed. Rep. of Germany ....... 2831095

[51] Int. Cl.³ ............................................... C01F 7/50
[52] U.S. Cl. .................................................... 423/465
[58] Field of Search ............................423/116, 465 BA

[56] References Cited

U.S. PATENT DOCUMENTS

| | | | |
|---|---|---|---|
| 2,492,650 | 12/1949 | McLean | 423/465 |
| 3,825,659 | 7/1974 | Harrison et al. | 423/465 |

FOREIGN PATENT DOCUMENTS 262880  5/1970  U.S.S.R. .................................. 423/465

*Primary Examiner*—Brian E. Hearn
*Attorney, Agent, or Firm*—Ladas & Parry

[57] ABSTRACT

An improved process for the preparation of crystalline cryolite having a molar ratio Na:Al of 2.9:1 to 3.0:1, by reacting aqueous solutions of aluminum fluoride with at least a stoichiometric amount of sodium fluoride in aqueous solution, while heating, in the presence of cryolite seed crystals, wherein the sodium fluoride is used in an amount of 3.2 to 3.5 moles of sodium per mole of aluminum, the aluminum fluoride concentration being from 15 to 250 g./l., the sodium fluoride concentration being from 30 to 42 g./l., the reaction temperature being from 85° to 100° C., the reaction time from 0.5 to 3 hours and the pH value in the reaction mixture from 5 to 8, to provide an end product having an adsorbed water content of 8% or less.

3 Claims, No Drawings

PREPARATION OF CRYSTALLINE CRYOLITE

BACKGROUND OF THE INVENTION

This invention relates to an improved process for the preparation of crystalline cryolite which has a molar ratio Na:Al of 2.9:1 to 3.0:1 and has a particularly low adsorbed water content, i.e., a maximum water content of 8% by weight.

According to U.S. Pat. No. 3,897,543, in order to obtain well-crystallized cryolite having a relatively low water content and possessing the abovementioned molar composition, it is necessary to employ hydrofluoric acid, which is relatively expensive, and to carry out the process in an acid medium at a pH of between 0 and 1. Since the starting material is a solution of sodium chloride or sodium sulfate, the effluent has a high content of hydrochloric acid or sulfuric acid, and the process itself must be carried out in vessels made from corrosion-resistant alloys. The need to control the pH accurately by means of glass electrodes in the hydrofluoric acid medium is a further disadvantage.

The older Hungarian Pat. No. 157,309 also relates to the preparation of crystalline cryolite, the adsorbed water content of which is comparable with that of the abovementioned patent. After filtration of the end product, the water content is about 12 to 16% by weight, whilst after centrifuging it is 6 to 10% by weight. According to this prior art process, the molar ratio of the reactants NaF and $AlF_3$ in the reaction mixture must be between 2.75 and 2.98, but preferably 2.90. As is stated expressly in one of the experimental examples, a pH value of 5 must not be exceeded under these conditions, because a higher pH results in poorer crystallinity of the end product.

According to British Pat. No. 643,570, again, acid pH values (below 3) should be maintained, though in this case, in order to prevent an unacceptably high degree of contamination of the end product with silica.

According to West German Auslegeschrift No. 1,088,035 synthetic cryolite, having a very low content of phosphorus compounds, is prepared, starting from aluminum fluoride, by keeping the pH value of the reaction mixture below 2 by means of mineral acids, the compounds which provide sodium and fluorine being employed at least in the stoichiometric amount required for the conversion of aluminum fluoride, but preferably in larger amounts, which are not defined in more detail. These measures serve to prevent the formation of sparingly soluble iron, titanium or aluminum phosphate complexes, by forming soluble fluorine complexes. The Specification does not refer to the possible water content of the end product. However, the latter is probably high, as emerges from the drying and calcination times, amounting to hours, required for the amounts of cryolite produced on a laboratory scale.

Surprisingly, it has now been found that a "stoichiometric" crystalline cryolite with an even lower water content than that of the material mentioned in the Hungarian Patent Specification may be obtained if a series of specific measures is observed, including, inter alia, that a specific, narrowly restricted molar ratio of Na:Al varying from about the stoichiometric ratio to a 20% excess of NaF, is maintained in the reaction mixture, the pH values, in contrast to the older process, being between 5 and 8. These conditions result in an end product having a water content of between 6 and 8% where suction filtration is used and 1.5 to 4% if centrifuging is used.

SUMMARY OF THE INVENTION

Accordingly, the present invention provides an improvement in the process for the preparation of crystalline cryolite having a molar ratio Na:Al of 2.9:1 to 3.0:1 and a maximum adsorbed water content of 8% by weight, by reacting an aqueous solution of aluminum fluoride with at least a stoichiometric amount of an aqueous solution of sodium fluoride whilst heating and stirring in the presence of cryolite seed crystals, separating off the product which has crystallized out and calcining it, which comprises using the sodium fluoride in an amount of 3.2 to 3.5 moles of sodium per mole of aluminum, the aluminum fluoride concentration being 15 to 250 g./l., the concentration of the sodium fluoride solution being 30 to 42 g./l. and mixing the two solutions with one another at a temperature within the range of 85° to 100° C. in the course of 0.5 to 3 hours, the pH value of the reaction mixture being maintained at from 5 to 8.

It is preferred to start with a solution having an aluminum fluoride concentration from 15 to 150 g./l., which means that using the process according to the invention even aluminum fluoride-containing mother liquors from the preparation of aluminum fluoride may be worked up to give cryolite of extremely low water content. The preferred pH range of the reaction is from 5 to 7. This is surprising since, as has been mentioned above, according to prior art disclosed in Hungarian Pat. No. 157,309 pH values of 5 must not be exceeded under any circumstances. In contrast to British Pat. No. 643,510, the $SiO_2$ content of the end product nevertheless corresponds to specification. Since, furthermore, the pH value of the sodium fluoride solution employed is in general about 8, according to the invention, the pH value required in the reaction mixture is frequently achieved by simply mixing the reactants. If necessary, the pH value may be adjusted subsequently.

It is true that the reaction temperatures and reaction times are known per se from other cryolite processes, although in the prior art these conditions have lead to products of higher water contents, however, they are essential, in conjunction with the remaining parameters according to the invention, for the success of the process; i.e., the preparation of crystalline cryolite of extremely low water content. The same is true for the sodium fluoride concentration employed, the upper limit of the concentration range according to the invention being imposed by the solubility of the sodium fluoride.

An important advantage of the process according to the invention is that if all the conditions according to the invention are maintained, the cryolite is precipitated substantially quantitatively and in addition optimum low water contents are achieved. Thus, under comparable conditions of temperature and stirring, an experiment carried out with a Na:Al ratio of 3.08 at a pH value of 5.0 gives a Na:Al ratio in the end product of 2.91, an adsorbed water content in the end product, after suction filtration of 4.4% by weight, and an aluminum content of the effluent of 0.8% by weight of the aluminum employed. At a molar ratio Na:Al in the reaction mixture of 3.4 and a pH value of 5.8, a cryolite having a Na:Al ratio of 2.94 is obtained, which contains 6.2% by weight of water after suction filtration, the aluminum content of the effluent being virtually 0. At a stoichiometric ratio Na:Al of 3.0 and pH values of about 4 to 4.5 downwards, on the other hand, the water content in the end product, as well as the aluminum content in the effluent, increases greatly. Molar ratios Na:Al in the reaction mixture of 3.2:1 to 3.5:1 ensure a Na:Al ratio in the filtered-off cryolite of 2.92 to 2.94. These values are sufficiently good to fall under the concept of "stoichiometric cryolite". If a pH value of 8 is exceeded, the same remarks apply as when the pH value falls below about 5.

An important feature in transferring the process to an industrial scale is that the process may be carried out continuously; in this, it has proved particularly advantageous to spray the sodium fluoride solution on to the reaction mixture, containing the cryolite seed crystals, whilst stirring the mixture, because the crystallinity of the end product is improved by this method.

The selection of optimum stirring conditions presents no difficulties even on an industrial scale.

The Examples which follow illustrate the process according to the invention in more detail. In the Examples all percentages are by weight.

EXAMPLE 1

Cryolite is prepared by reacting an aluminum fluoride solution, having an $AlF_3$ content of 31.4 g./l. and a sodium fluoride solution having a NaF content of 35.4 g./l., in various molar ratios in accordance with the Table which follows. The two solutions are metered simultaneously, in the course of 100 minutes, into a crystallization vessel into which a cryolite suspension, which initially is of 0.4% strength, is first introduced. The temperature in the reaction vessel is maintained at about 95° C. After all has been metered in, the product is filtered off on a suction filter and the adsorbed water is removed by drying at 130° C. The cryolite is then calcined for 2 hours at 600° C.

The results are shown in the Table which follows:

| a | b | c | d | e | f | g |
|---|---|---|---|---|---|---|
| 3.01 | 1.3 | 5.0 | 8.0 | 0.47 | 35.2 | 2.90 |
| 3.08 | 0.8 | 5.0 | 4.4 | 0.58 | 51.4 | 2.91 |
| 3.23 | 0.0 | 5.3 | 5.3 | 0.52 | 32.0 | 2.92 |
| 3.44 | 0.0 | 5.8 | 6.2 | 0.42 | 10.7 | 2.94 | a = molar ratio Na:Al starting solution;
b = % of Al employed present in the mother liquor;
c = pH of the mother liquor;
d = % adsorbed moisture of the product (after filtration);
e = % loss on calcining the product (600° C., 2 hours);
f = % of the product with a particle size greater than 120μ;
g = molar ratio Na:Al in the product.

The silica content of the aluminum fluoride solution employed was 0.21 g./l. of $SiO_2$, whilst that of the sodium fluoride solution was 0.47 g./l. of $SiO_2$. The end products contained 0.03 to 0.09% of $SiO_2$.

If, however, the molar ratio Na:Al is 2.76:1, at a pH value of 4.5, an end product containing 19.4% of water is obtained. If, at the same pH value, the molar ratio Na:Al is 2.87:1, the water content of the end product is 15.2%.

EXAMPLE 2

A suspension of 2 g. of cryolite in 500 ml. of water is heated to 100° C. 500 Ml. of a technical grade sodium fluoride solution containing 39.7 g./l. and having a pH value of 8, and 177 ml. of an aluminum fluoride solution containing 62.4 g./l. are simultaneously added dropwise in the course of 90 minutes, whilst stirring. The Na:Al ratio in the reaction mixture was 3.59:1. The pH value of the solution was 7.5. The end product, filtered off on a suction filter, had a Na:Al ratio of 2.96, the yield being quantitative. The Al content in the effluent was less than 1 mg./l. The water content after suction filtration was 7.7%.

EXAMPLE 3

0.320 m$^3$ Of an aluminum fluoride solution containing 128.3 g./l. of aluminum fluoride was introduced into a cryolite suspension, contained in a 5 m$^3$ reaction vessel, the suspension being kept at 95° C. and stirred, and simultaneously 1.792 m$^3$/l. of sodium fluoride solution containing 37.8 g./l. of sodium fluoride was sprayed on to the surface of the reaction mixture. The Na:Al ratio in the solution was 3.30:1. The average pH value was 6 to 6.5. The cryolite suspension was simultaneously withdrawn continuously from the reaction vessel and centrifuged.

The residence time was about three hours, and the cryolite obtained contained 1.8% of adsorbed water and after calcination at 550° C. gave a yield of 101.1 kg per hour of material having the following analysis: 12.8% of Al, 32.5% of Na, 55.1% of F, 0.05% of $SiO_2$, Na:Al ratio 2.98:1. Yield 98%.

The effluent contains about 0.1 g./l. of aluminum, 1.7 g./l. of sodium and 1.1 g./l. of fluorine. About ⅔ of the effluent is recirculated to prepare the sodium chloride solution (from $H_2SiF_6$ and $Na_2CO_3$), so that the fluorine loss is about 0.9 kg. per hour and a total fluorine yield of more than 98% is achieved.

We claim:

1. In a process for the preparation of crystalline cryolite having a molar ratio Na:Al of 2.9:1 to 3.0:1 and a maximum adsorbed water content of 8% by weight, by reacting an aqueous solution of aluminum fluoride with at least a stoichiometric amount of an aqueous solution of sodium fluoride whilst heating and stirring in the presence of cryolite seed crystals, separating off the product which has crystallized out and calcining it, the improvement which comprises using the sodium fluoride in an amount of 3.2 to 3.5 moles of sodium per mole of aluminum, the aluminum fluoride concentration being 15 to 250 g./l., the concentration of the sodium fluoride solution is 30 to 42 g./l. and mixing the two solutions with one another at a temperature within the range of 85° to 100° C. in the course of 0.5 to 3 hours, the pH value of the reaction mixture being maintained at from 5 to 8.

2. A process according to claim 1, in which the aluminum concentration is from 15 to 150 g./l.

3. A process according to claim 1, in which the pH value is from 5 to 7.

* * * * *